(12) United States Patent
Cheng (10) Patent No.: US 8,695,158 B2
(45) Date of Patent: Apr. 15, 2014

(54) LOADING MECHANISM OF DUST-COLLECTING APPARATUS

(75) Inventor: Yuan-Tai Cheng, Taichung (TW)

(73) Assignee: San Ford Machinery Co., Ltd., Taichung (TW)

( * ) Notice: Subject to any disclaimer, the term of this patent is extended or adjusted under 35 U.S.C. 154(b) by 493 days.

(21) Appl. No.: 13/114,271

(22) Filed: May 24, 2011

(65) Prior Publication Data

US 2012/0297569 A1    Nov. 29, 2012

(51) Int. Cl.
*A47L 9/10* (2006.01)
*B01D 53/00* (2006.01)

(52) U.S. Cl.
USPC ............... 15/352; 15/323; 55/429; 55/357; 55/428; 55/DIG. 3

(58) Field of Classification Search
USPC .............. 15/323, 347, 352, 353; 55/429, 357, 55/428, DIG. 3
IPC ..................................... A47L 9/10; B01D 53/00
See application file for complete search history.

(56) References Cited

U.S. PATENT DOCUMENTS

| | | | | |
|---|---|---|---|---|
| 2,662,696 A * | 12/1953 | Nerwin | ...................... | 242/348.1 |
| 4,133,658 A * | 1/1979 | Callewyn | ........................ | 55/315 |
| 8,147,580 B2 * | 4/2012 | Lin | ................. | 55/429 |
| 8,394,162 B2 * | 3/2013 | Lin | ................. | 55/429 |
| 8,491,686 B2 * | 7/2013 | Witter et al. | .................... | 55/337 |

* cited by examiner

*Primary Examiner* — David Redding
(74) *Attorney, Agent, or Firm* — Ming Chow; Sinorica, LLC (57) ABSTRACT

A loading mechanism is disposed on a dust-collecting apparatus. The loading mechanism includes two positioning members disposed on a dust-collecting bucket of the dust-collecting apparatus, two support members disposed on the dust-collecting apparatus, two slide members respectively sliding on the support members, an operation member connected to the slide members, and two limit members connected with the operation member and the support members. The slide members can engage with the positioning members. The user just pulls up the operation member to link the slide members to slide along the support members, such that the dust-collecting bucket can be connected to the dust-collecting apparatus or detached from the dust-collecting apparatus quickly and conveniently.

7 Claims, 7 Drawing Sheets

LOADING MECHANISM OF DUST-COLLECTING APPARATUS

BACKGROUND OF THE INVENTION

1. Field of the Invention

The present invention relates to a loading mechanism of a dust-collecting apparatus.

2. Description of the Prior Art

Figure 1:
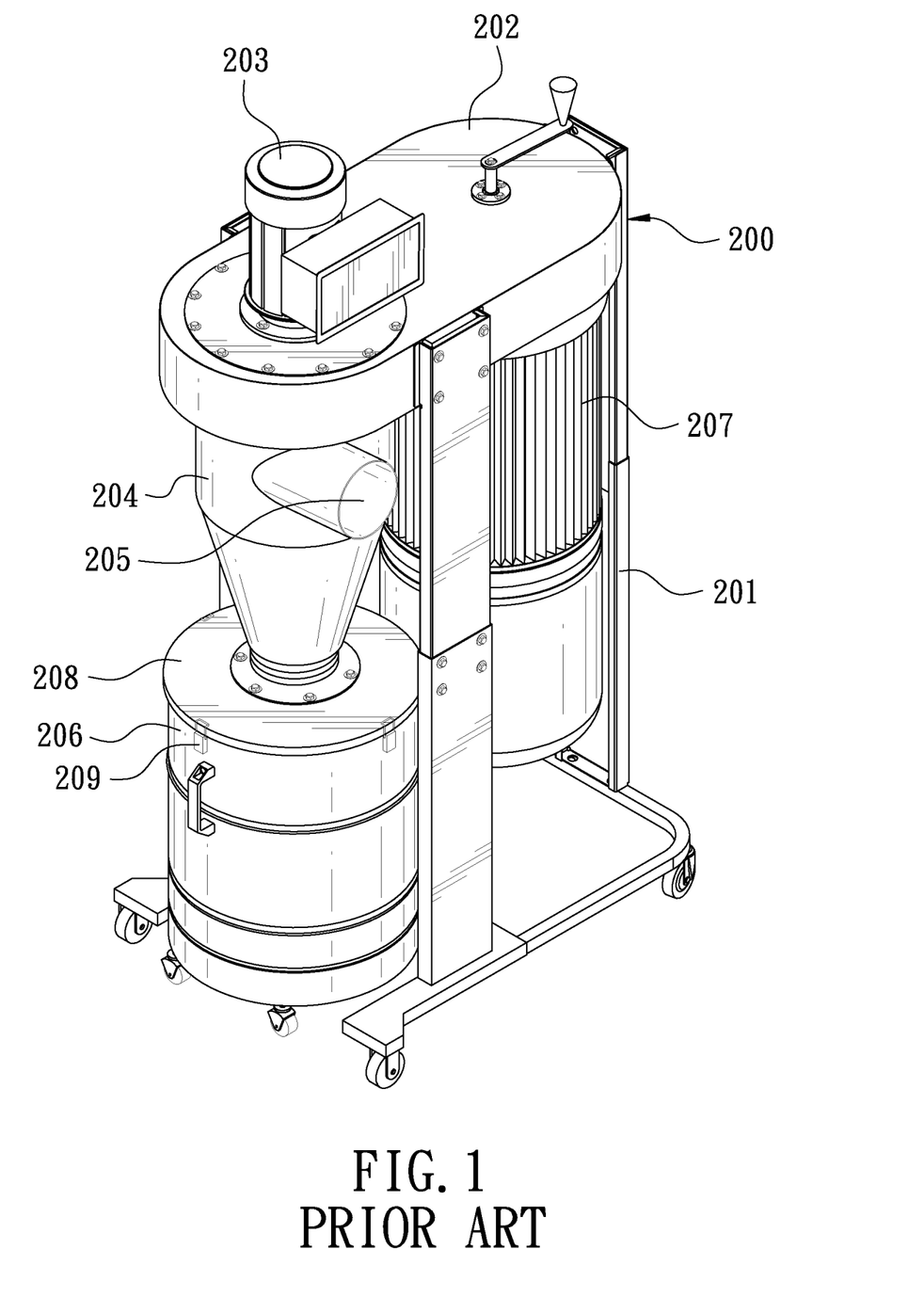
FIG. 1 is a perspective view of a conventional dust-collecting apparatus.

A dust-collecting apparatus is used to collect and filter dust of the surrounding so as to maintain the air quality. FIG. 1 is a perspective view of a conventional dust-collecting apparatus. The conventional dust-collecting apparatus 100 comprises a retaining frame 201, a wind box 202 on the retaining frame 201, a fan 203 on top of the wind box 202, and a wind guide bucket 204 located at the bottom of the wind box 202 and corresponding in position to the fan 203. The wind guide bucket 204 has a wind inlet 205 at a peripheral side in the direction of a tangent. A dust-collection bucket 206 is provided under the wind guide bucket 204. A filter bucket 207 is connected to the bottom of the wind box 202. When the fan is started, the surrounding air will be inhaled to the wind guide bucket 204 through the wind inlet 205. The inhaled air forms a whirlpool along the inner wall of the wind guide bucket 204 to fling off the dust of the air by the centrifugal force, and the dust falls in the dust-collecting bucket 206. After that, the air will be guided to the wind box 202 and filtered by the filter bucket 207. Finally, the air is sent to the surrounding. This can filter the dust in the air.

After a period of use, it is necessary to replace or clean the dust-collecting bucket 206. Therefore, the conventional dust-collecting apparatus 200 has a connecting portion 208 under the wind guide bucket 204. For example, the connecting portion 208 is a bucket lid corresponding in shape to the dust-collecting bucket 206. The dust-collecting bucket 206 is provided with plurality of buckles 209 around its peripheral side for connecting the connecting portion 208 with the dust-collecting bucket 206, such that the dust-collecting bucket 206 can be detached from the conventional dust-collecting apparatus 200 for cleaning or replacement. However, in order to have an absolute seal, the dust-collecting bucket 206 must have a few buckles 209 on its peripheral side. This consumes time to lock or unlock the buckles 209 one by one to detach the dust-collecting bucket 206. Accordingly, the inventor of the present invention has devoted himself based on his many years of practical experiences to solve this problem.

SUMMARY OF THE INVENTION

The primary object of the present invention is to provide a loading mechanism of a dust-collecting apparatus for assisting the user to install a dust-collecting bucket quickly and conveniently.

In order to achieve the aforesaid object, the loading mechanism of the present invention is disposed on a dust-collecting apparatus. The dust-collecting apparatus comprises a retaining frame, a wind box on the retaining frame and a wind guide pipe under the wind box. The wind guide pipe has a connecting portion to connect with a dust-collecting bucket. The loading mechanism comprises two positioning members, two support members, two slide members, an operation member, two limit members and two elastic members. The two positioning members are respectively fixed to two sides of the dust-collecting bucket. Each positioning member has a first positioning portion. The two support members respectively located at the two sides of the dust-collecting bucket. Each support member comprises a support rod fixed to the retaining frame. The two slide members slidably connected to the support rods of the two support members, respectively. Each slide member has a second positioning portion corresponding to the first positioning portion. The second positioning portion and the first positioning portion engage with each other. The operation member is disposed close to the dust-collecting bucket. The operation member has an operation rod. The operation rod has a pair of connecting rods at two ends thereof. The connecting rods are pivotally connected to the slide members, respectively. The two limit members respectively located at the two sides of the dust-collecting bucket. Each limit member has one end pivotally connected to the relative support rod and another end pivotally connected to the relative connecting rod.

When the user wants to install the dust-collecting bucket on the dust-collecting apparatus, the user pulls up the operation member and pushes the dust-collecting bucket into the loading mechanism. The first positioning portions of the positioning members engage with the second positioning portions of the slide members. After that, the operation member is pressed down. The operation member links the slide members to move up along the support members, such that the dust-collecting bucket is lifted to connect with the connecting portion of the dust-collecting apparatus. When the user wants to detach the dust-collecting bucket from the dust-collecting apparatus, he/she just pulls up the operation member. The dust-collecting bucket will be detached from the connecting portion. Through the loading mechanism, the dust-collecting bucket can be installed or detached quickly and conveniently to enhance the work efficiency.

DETAILED DESCRIPTION OF THE PREFERRED EMBODIMENTS

Embodiments of the present invention will now be described, by way of example only, with reference to the accompanying drawings.

Figure 2:
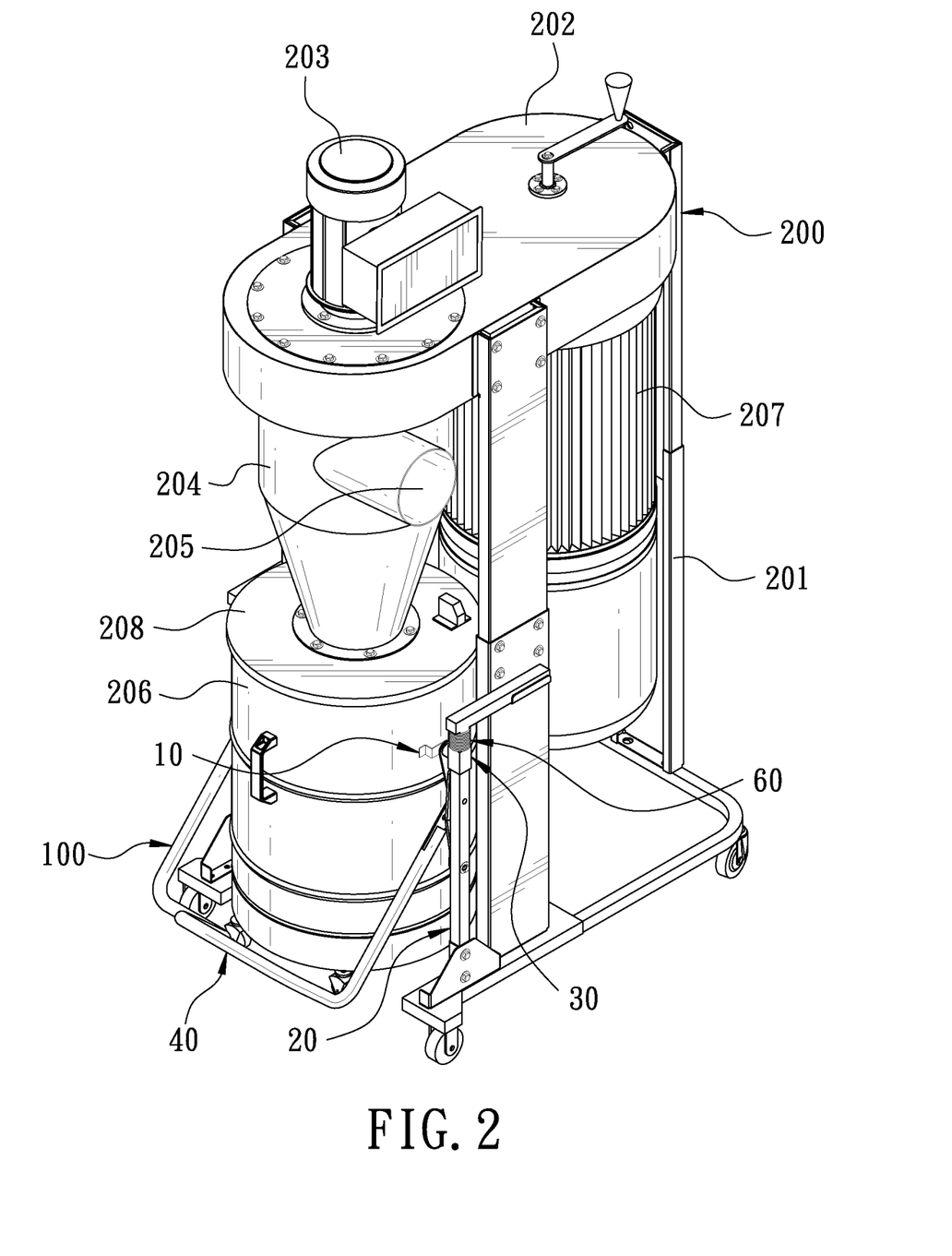
FIG. 2 is a perspective view according to a preferred embodiment of the present invention.
Figure 3:
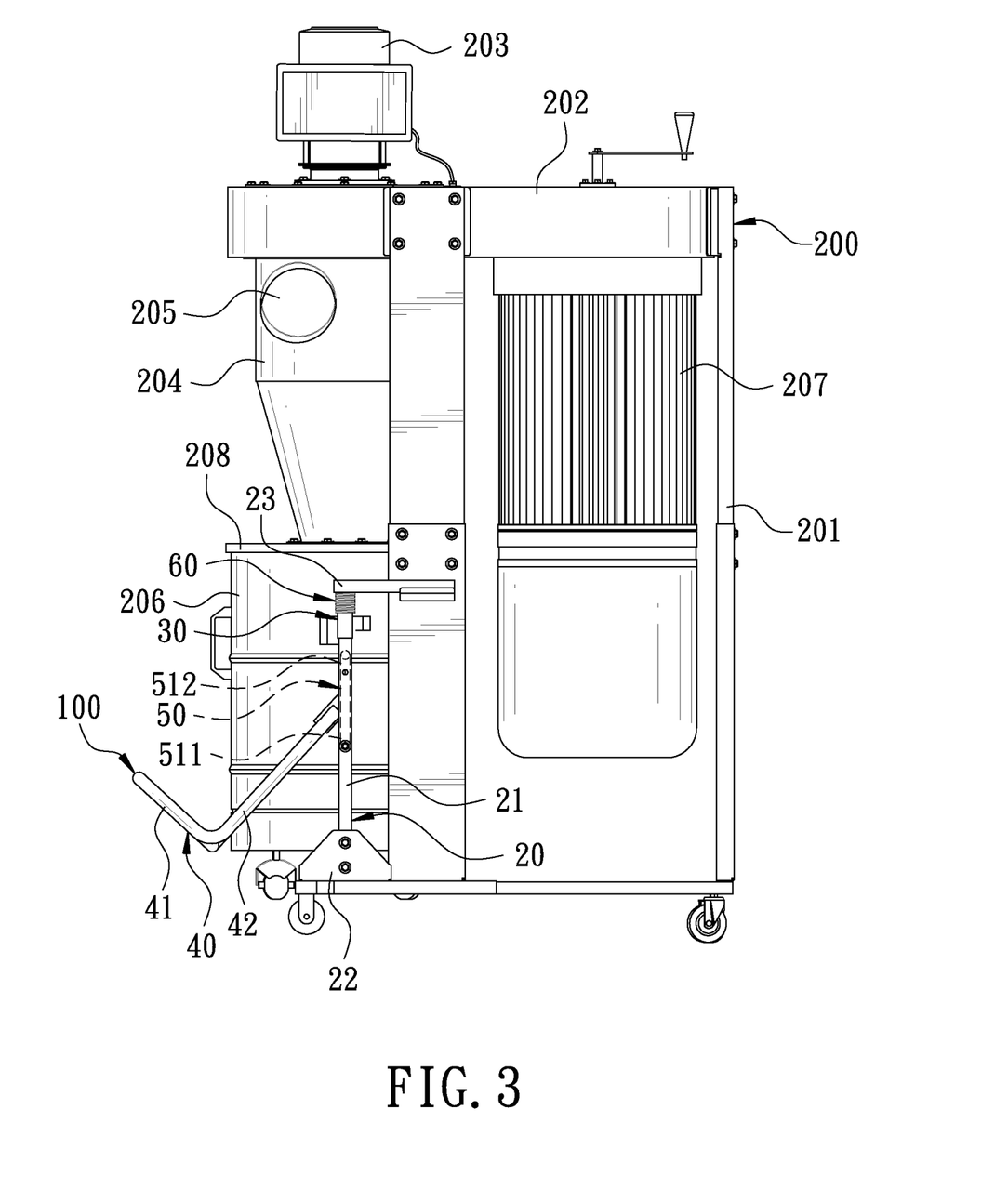
FIG. 3 is a side view according to the preferred embodiment of the present invention.
Figure 4:
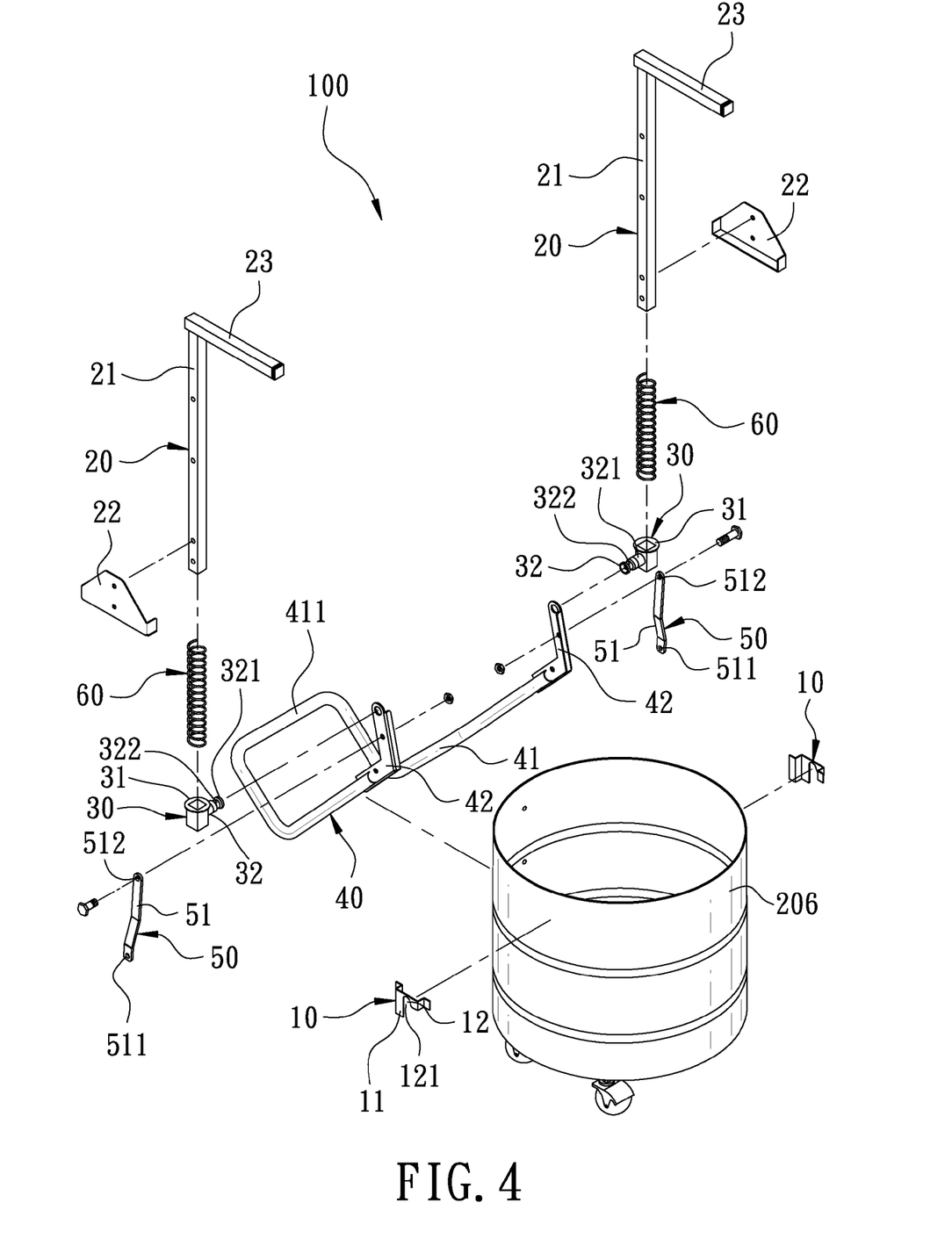
FIG. 4 is an exploded view of the loading mechanism according to the preferred embodiment of the present invention.

FIG. 2 is a perspective view according to a preferred embodiment of the present invention. FIG. 3 is a side view according to the preferred embodiment of the present invention. FIG. 4 is an exploded view of the loading mechanism according to the preferred embodiment of the present invention. The present invention relates to a loading mechanism 100 of a dust-collecting apparatus. The loading mechanism 100 is disposed on the dust-collecting apparatus 200 mentioned above.

The loading mechanism 100 comprises two positioning members 10, two support members 20, two slide members 30, an operation member 40, two limit members 50, and two elastic members 60.

The two positioning members 10 are respectively fixed to two sides of the dust-collecting bucket 206. Each positioning member 10 comprises a base 11 fixed to the dust-collecting bucket 206. The base 11 has a first positioning portion 12. In this embodiment, the base 11 has a positioning recess 121 to form the first positioning portion 12.

The two support members 20 are respectively located at the two sides of the dust-collecting bucket 206. Each support member 20 comprises a support rod 21 fixed to the retaining frame 201. In this embodiment, one end of the support rod 21 is provided with a seat 22, and another end of the support rod 21 is provided with a fixed rod 23 which is perpendicular to the support rod 21. The support rod 21 and the fixed rod 23 are connected to the retaining frame 201 through the seat 22.

The two slide members 30 are slidably connected to the support rods 21 of the two support members 20, respectively. Each slide member 30 comprises a sleeve 31 to slide along the support rod 21. The sleeve 31 has a second positioning portion 32 corresponding to the first positioning portion 12. The second positioning portion 32 and the first positioning portion 12 can engage with each other. In this embodiment, the sleeve 31 comprises a positioning post 321 protruding from a peripheral side thereof to form the second positioning portion 32. The positioning post 321 has an annular groove 322 on a peripheral side thereof for engaging with the positioning recess 121.

The operation member 40 is disposed close to the dust-collecting bucket 206, and has an operation rod 41. The operation rod 41 has a bent portion 411 for the user to pull and operate the operation member 40. The operation rod 41 has a pair of connecting rods 42 at two ends thereof. The connecting rods 42 are disposed toward the direction of the slide members 30 and pivotally connected to the slide members 30, respectively.

The two limit members 50 are respectively located at the two sides of the dust-collecting bucket 206. Each limit member 50 has a limit rod 51. One end of the limit rod 51 is defined as a first end 511 which is pivotally connected to the support rod 21. Another end of the limit rod 51 is defined as a second end 512 which is pivotally connected to the connecting rod 42.

The two elastic members 60 are respectively fitted on the support rods 21 and located between the slide member 30 and the fixed rod 23.

Figure 5:
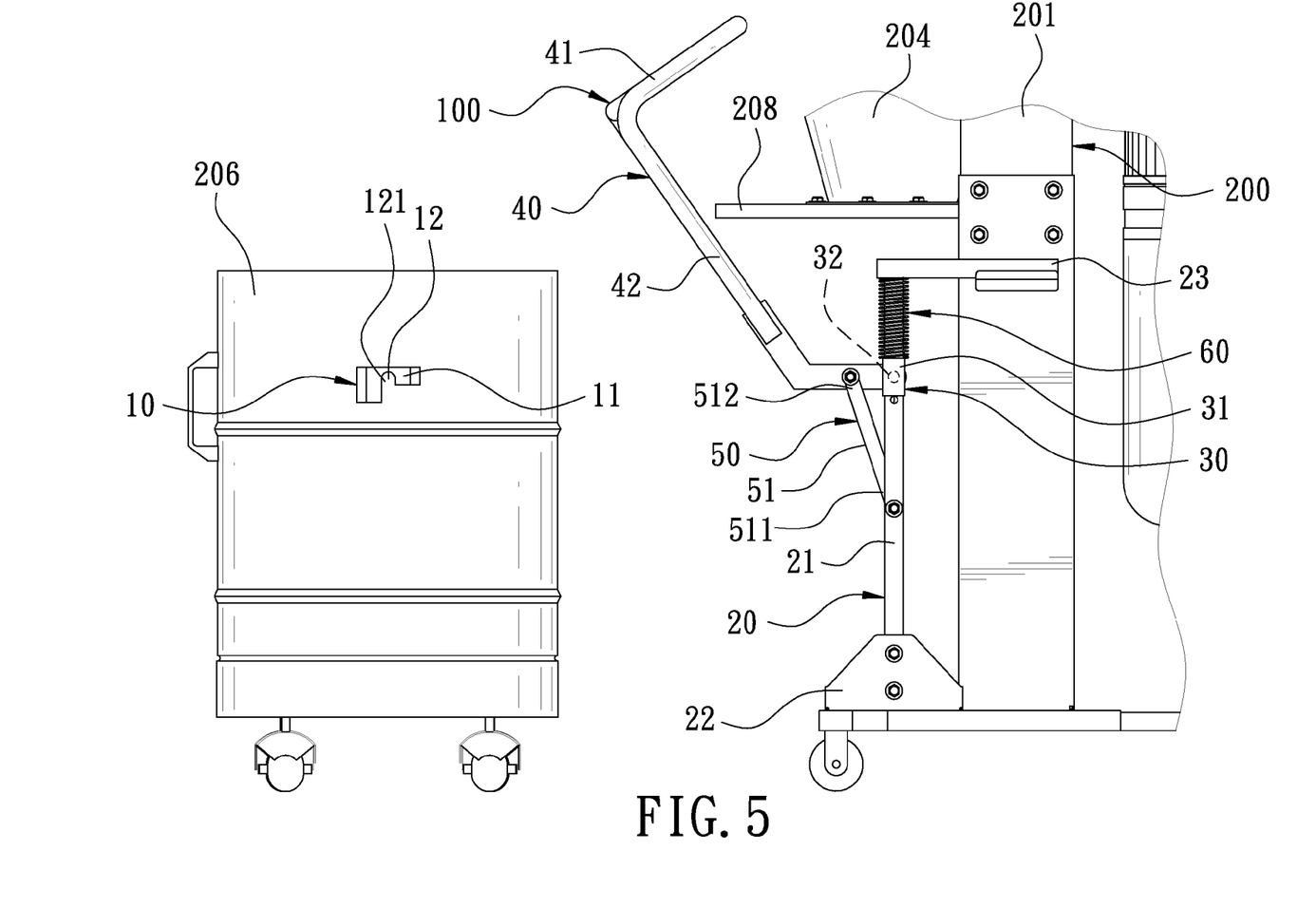
FIG. 5 is a partial enlarged view according to the preferred embodiment of the present invention, showing the dust-collecting bucket not installed to the dust-collecting apparatus.
Figure 6:
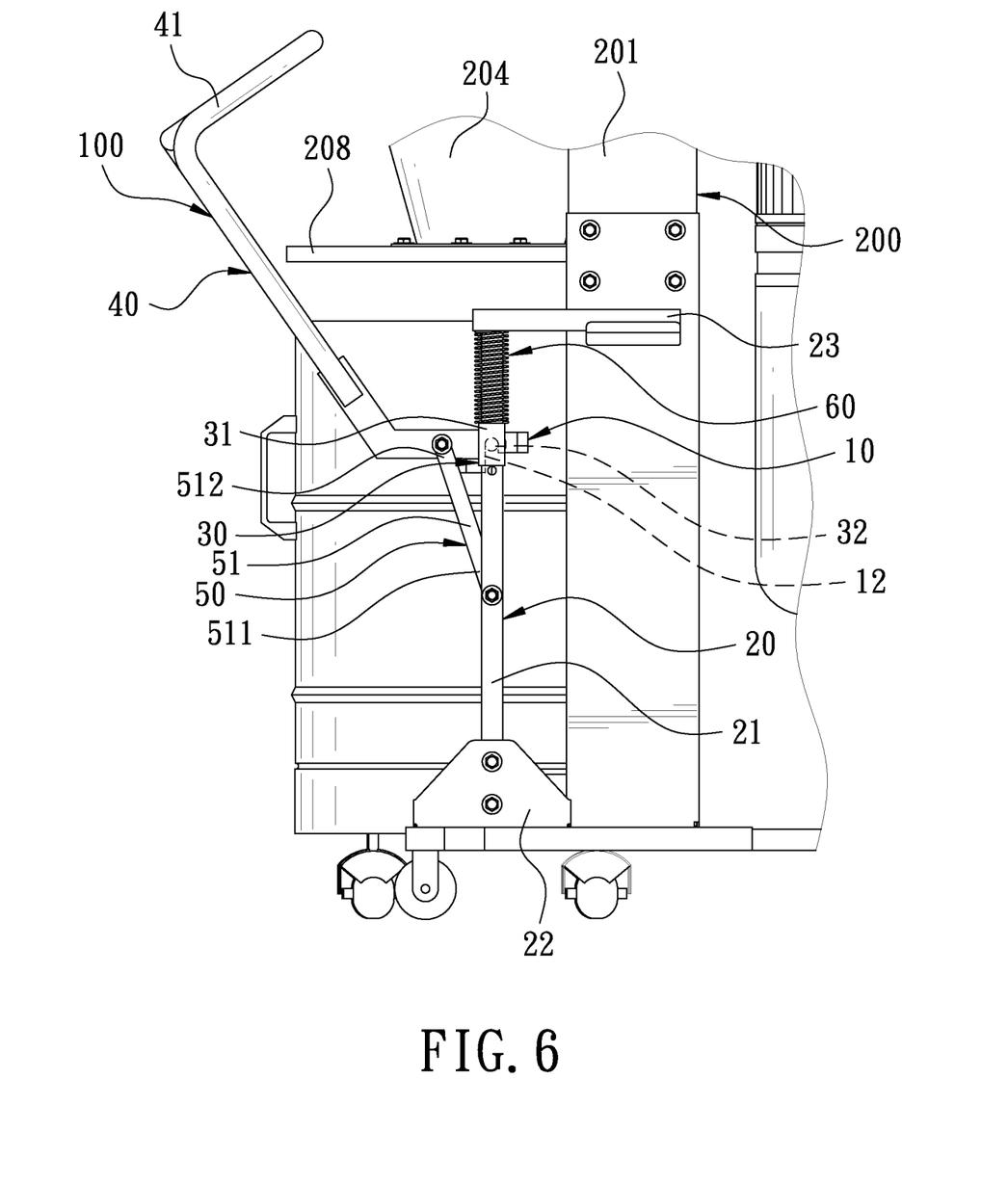
FIG. 6 is a partial enlarged view according to the preferred embodiment of the present invention, showing the dust-collecting bucket connected with the loading mechanism but not installed to the dust-collecting apparatus.
Figure 7:
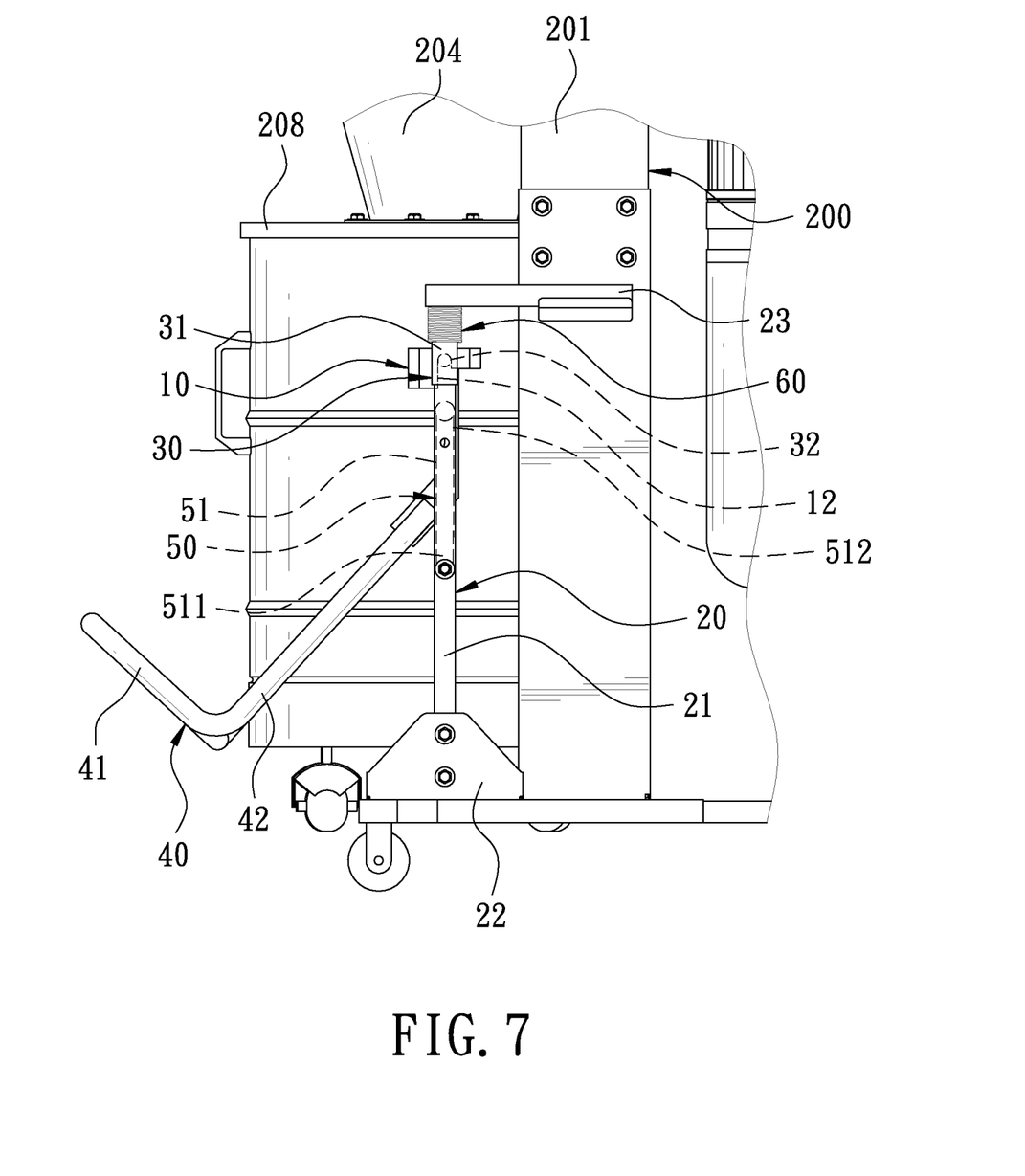
FIG. 7 is a partial enlarged view according to the preferred embodiment of the present invention, showing the dust-collecting bucket installed to the dust-collecting apparatus.

FIG. 5, FIG. 6 and FIG. 7 are partial enlarged views according to the preferred embodiment of the present invention. When the user wants to install the dust-collecting bucket 206 on the dust-collecting apparatus 200, the user has to pull up the operation member 40 as shown in FIG. 5 and push the dust-collecting bucket 206 into the loading mechanism 100 as shown in FIG. 6. The first positioning portions 12 of the positioning members 10 engage with the second positioning portions 32 of the slide members 30. After that, the operation member 40 is pressed down as shown in FIG. 7. The operation member 40 link the slide members 30 to move up along the support members 21, such that the dust-collecting bucket 206 is lifted to connect with the connecting portion 208 of the dust-collecting apparatus 200. The second ends 512 of the limit members 50 are moved to the sides of the support rods 21 by the operation member 40 with the first ends 511 as the pivots. The limit rods 51 are parallel to the support rods 21. The first end 511 and the second end 512 of the limit member 51 and the slide member 30 are aligned. Due to the toggle effect, the loading mechanism 100 forms a dead point state to secure the operation member 40 after the user releases the operation member 40, such that the dust-collecting bucket 206 is tightly connected with the connecting portion 208 to complete the assembly of the dust-collecting bucket 206.

When the user wants to detach the dust-collecting bucket 206 from the dust-collecting apparatus 200, he/she just pulls up the operation member 40 to link the limit member 50 with the first end 511 as the pivot, and the second end 512 of the limit member 50 is moved from the side of the support rod 21 to release the dead point state of the loading mechanism 100. The slide members 30 move down along the support rods 21, so that the dust-collecting bucket 206 is detached from the connecting portion 208.

Through the loading mechanism 100, the dust-collecting bucket 206 can be connected or detached quickly and conveniently to enhance the work efficiency.

It is noted that the operation rod 41 of the operation member 40 has the bent portion 411 for the user to pull the operation member 40 with ease. There is no need for the user to bend down or squat down. The user may pull the operation member 40 with his/her feet.

It is noted that the support rods 21 are provided with the elastic members 60. When the user pulls up the operation member 40, the elastic members 60 will provide an elastic force to press the slide members 30 so as to assist the user to pull up the operation member 40 easily.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A loading mechanism of a dust-collecting apparatus, the loading mechanism being disposed on the dust-collecting apparatus, the dust-collecting apparatus comprising a retaining frame, a wind box on the retaining frame and a wind guide pipe under the wind box, the wind guide pipe having a connecting portion to connect with a dust-collecting bucket, the loading mechanism comprising:

two positioning members respectively fixed to two sides of the dust-collecting bucket, each positioning member having a first positioning portion;

two support members respectively located at the two sides of the dust-collecting bucket, each support member comprising a support rod fixed to the retaining frame;

two slide members slidably connected to the support rods of the two support members respectively, each slide member having a second positioning portion corresponding to the first positioning portion, the second positioning portion and the first positioning portion engaging with each other;

an operation member disposed close to the dust-collecting bucket, the operation member having an operation rod, the operation rod having a pair of connecting rods at two ends thereof, the connecting rods being pivotally connected to the slide members respectively; and two limit members respectively located at the two sides of the dust-collecting bucket, each limit member having one end pivotally connected to the relative support rod and another end pivotally connected to the relative connecting rod.

2. The loading mechanism of a dust-collecting apparatus as claimed in claim 1, wherein each positioning member comprises a base fixed to the dust-collecting bucket, the base having a positioning recess to form the first positioning portion, each slide member comprising a sleeve to slide along the support rod, the sleeve comprising a positioning post protruding from a peripheral side thereof to form the second positioning portion.

3. The loading mechanism of a dust-collecting apparatus as claimed in claim 2, wherein the positioning post has an annular groove on a peripheral side thereof.

4. The loading mechanism of a dust-collecting apparatus as claimed in claim 1, wherein one end of the support rod is provided with a seat and another end of the support rod is provided with a fixed rod which is perpendicular to the support rod, the support rod and the fixed rod being connected to the retaining frame through the seat.

5. The loading mechanism of a dust-collecting apparatus as claimed in claim 4, wherein the loading mechanism further comprises two elastic members, the elastic members being respectively fitted on the support rods of the two support members and located between the slide member and the fixed rod.

6. The loading mechanism of a dust-collecting apparatus as claimed in claim 1, wherein the operation rod has a bent portion.

7. The loading mechanism of a dust-collecting apparatus as claimed in claim 1, wherein each limit member has a limit rod, one end of the limit rod being defined as a first end which is pivotally connected to the support rod, the other end of the limit rod being defined as a second end which is pivotally connected to the connecting rod.

* * * * *